United States Patent

Hill et al.

[19]

[11] Patent Number: 6,088,804
[45] Date of Patent: Jul. 11, 2000

[54] ADAPTIVE SYSTEM AND METHOD FOR RESPONDING TO COMPUTER NETWORK SECURITY ATTACKS

[75] Inventors: Douglas W. Hill, Scottsdale; James T. Lynn, Mesa, both of Ariz.

[73] Assignee: Motorola, Inc., Schaumburg, Ill.

[21] Appl. No.: 09/006,056

[22] Filed: Jan. 12, 1998

[51] Int. Cl.[7] ............................. G06F 11/30; H04L 9/00
[52] U.S. Cl. .................... 713/201; 713/200; 713/201
[58] Field of Search .................... 713/201, 200; 714/38, 47, 48, 57; 380/4

[56] References Cited

U.S. PATENT DOCUMENTS

| | | | |
|---|---|---|---|
| 5,062,147 | 10/1991 | Pickett et al. | 714/57 |
| 5,237,677 | 8/1993 | Hirosawa et al. | 714/57 |
| 5,414,833 | 5/1995 | Heshey et al. | 713/201 |
| 5,440,723 | 8/1995 | Arnold et al. | 714/2 |
| 5,452,442 | 9/1995 | Kephart | 380/4 |
| 5,491,791 | 2/1996 | Glowny et al. | 714/47 |
| 5,511,163 | 4/1996 | Lerche et al. | 714/39 |

FOREIGN PATENT DOCUMENTS

WO 93/22723  3/1993  WIPO .

OTHER PUBLICATIONS

Doumas et al. Design of a Neural Network for Recognition and Classification of Computer Virsul. pp. 435–448, 1995.
Tesauro et al. Neural networks for computer virusl recognition. pp. 5–6, Aug. 1996.

*Primary Examiner*—Ly V. Hua
*Attorney, Agent, or Firm*—Gregory J. Gorrie

[57] ABSTRACT

A dynamic network security system (20) responds to a security attack (92) on a computer network (22) having a multiplicity of computer nodes (24). The security system (20) includes a plurality of security agents (36) that concurrently detect occurrences of security events (50) on associated computer nodes (24). A processor (40) processes the security events (50) that are received from the security agents (36) to form an attack signature (94) of the attack (92). A network status display (42) displays multi-dimensional attack status information representing the attack (92) in a two dimensional image to indicate the overall nature and severity of the attack (92). The network status display (42) also includes a list of recommended actions (112) for mitigating the attack. The security system (20) is adapted to respond to a subsequent attack that has a subsequent signature most closely resembling the attack signature (94).

19 Claims, 6 Drawing Sheets

| SECURITY EVENT TYPE | SECURITY EVENTS PER TYPE % | LOCATION IDENTIFIERS | ATTACK SEVERITY |
|---|---|---|---|
| SIMULATED ATTACK 1 | | | MEDIUM |
| DESTRUCTIVE VIRUS | .2 | | |
| SNOOPING VIRUS | 15 | | |
| WORM | 0 | | |
| TROJAN HORSE | .1 | | |
| FTP REQUEST | 5 | | |
| OVERLOAD | .05 | | |
| SIMULATED ATTACK 2 | | | LOW |
| DESTRUCTIVE VIRUS | .5 | | |
| SNOOPING VIRUS | 1.7 | | |
| WORM | .01 | | |
| TROJAN HORSE | .2 | | |
| FTP REQUEST | .05 | | |
| OVERLOAD | 1.2 | | |
| SIMULATED ATTACK 3 | | | |
| ⋮ | ⋮ | ⋮ | ⋮ |
| SIMULATED ATTACK n | | | HIGH |
| DESTRUCTIVE VIRUS | 25 | | |
| SNOOPING VIRUS | 12 | | |
| WORM | .2 | | |
| TROJAN HORSE | .4 | | |
| FTP REQUEST | 1.2 | | |
| OVERLOAD | .05 | | |

FIG. 3

| SECURITY EVENT TYPE | SECURITY EVENTS PER TYPE % | LOCATION IDENTIFIERS |
|---|---|---|
| DESTRUCTIVE VIRUS | .25 | |
| SNOOPING VIRUS | 15 | |
| WORM | 0 | |
| TROJAN HORSE | .1 | |
| FTP REQUEST | 5 | |
| OVERLOAD | .05 | |

ADAPTIVE SYSTEM AND METHOD FOR RESPONDING TO COMPUTER NETWORK SECURITY ATTACKS

FIELD OF THE INVENTION

The present invention relates generally to computer networks, and more particularly to systems and methods for adaptively responding to computer network security attacks.

BACKGROUND OF THE INVENTION

Network security management is becoming a more difficult problem as networks grow in size and become a more integral part of organizational operations. Attacks on networks are growing both due to the intellectual challenge such attacks represent for hackers and due to the increasing payoff for the serious attacker. Furthermore, the attacks are growing beyond the current capability of security management tools to identify and quickly respond to those attacks. As various attack methods are tried and ultimately repulsed, the attackers will attempt new approaches with more subtle attack features. Thus, maintaining network security is on-going, ever changing, and an increasingly complex problem.

Computer network attacks can take many forms and any one attack may include many security events of different types. Security events are anomalous network conditions each of which may cause an anti-security effect to a computer network. Security events include stealing confidential or private information; producing network damage through mechanisms such as viruses, worms, or Trojan horses; overwhelming the network's capability in order to cause denial of service, and so forth.

The first line of defense against all of these types of security events is typically the denial of access through good passwords and strong firewalls at the nodal level of a computer network. However, one of the unintended consequences of security systems that defeat attempts to steal information or produce network damage and report the status is that repelling a large scale attack may lead to such a large number of trouble messages as to overwhelm the network and lead to denial of service simply by the volume of messages.

A large network is likely to concurrently experience security events at some or multiple nodes on a frequent basis. Many of these security events are likely to be of low sophistication and easily repulsed by the protection software and systems at the affected nodes. Thus, real-time reporting of these security events can be counter productive when the reporting uses large amounts of bandwidth. However, a coordinated series of even low sophistication security events may indicate a real problem that must be addressed to maintain the network's capability and effectiveness.

Some conventional security management tools available to a network manager for determining the effects of attacks fall into three categories, network modelers, static analyzers and testers, and dynamic analyzers.

Network modeling tools are popular for the original design and updating of networks. They typically are configured with various communication protocols and node types and can depict the hierarchy of the network along with symbols for the various types of nodes in the network. They also have load generation modules to help the designer arrive at the needed capacity on the nodes and transmission paths. Network modeling tools are used to answer "what if" types of analysis questions. For example, by eliminating a node or set of nodes and one or more of the communication paths network modeling tools can simulate the effects of a successful attack. Also, additional load can be generated to simulate the messaging that might result from an attack, successful or not. Through these methods, the network administrator can gain some knowledge of the robustness of his or her design and validate some mitigation approaches. Unfortunately, a shortcoming of network modeling tools is that they cannot be used in a dynamic manner to display the current status of a network. Rather, they only display the entries from some network description data base.

Static analyzers are tools that may be used by a network manager to simulate an attack against his own network. Static analyzers can probe for network weaknesses by simulating certain types of security events that make up an attack. Other tools can test user passwords for suitability and security. There are also tools that can search for known types of security events in the form of malicious programs such as viruses, worms, and Trojan horses. Unfortunately, these tools either test the integrity of the network, or identify a security event after it has occurred. They do not provide an immediate response in the case of an attack made up of several security events of differing types.

Dynamic analyzers are tools that are used to monitor networks and respond at the time of the attack. Dynamic analyzers typically look for specific actions that signify an attack or compare user actions to previously stored statistics to identify significant changes. They also provide messages to the network manager when they sense a possible security event. However, this latter mechanism leads to a significant problem for network capacity if the number of security events were so large that the trouble message for an attack consumes all or a significant portion of the available bandwidth. Another problem with dynamic analyzers is that they work primarily on a nodal basis. Thus, they are unable to amalgamate the security events occurring at a multiplicity of nodes in a computer network to obtain a network view of an attack. So dynamic analyzers may miss the significance of a coordinated series of low level security events at multiple nodes. Also, because of their nodal orientation, their reports tend to be presented as lists of data that can be difficult to evaluate quickly in the event of a large scale attack, or an attack that involves many security events at many nodes.

Thus, what is needed is a system and a method that has the capability of providing a network view of an attack as the attack is occurring. Furthermore, what is needed is a system and method for displaying attack information in a usable and quickly interpretable form to a network manager while minimizing the loading on the computer network. If an attack occurs at a time of stress, a network manager may be overwhelmed with both responding to an attack and providing operational control and messages through the network. Thus, what is needed is a system and method that provides a network manager with knowledge of the severity and overall nature of the attack, what its expected impact could be, and a set of recommended actions. In addition, what is needed is a system and method that has the ability to evolve with evolving threats to effectively mitigate new approaches to network attacks.

SUMMARY OF THE INVENTION

The present invention provides, among other things, a method of operating a dynamic network security system to respond to a plurality of attacks on a computer network. In one embodiment, the method comprises the steps of training the security system to respond to a plurality of training signatures, each of the training signatures representing one of a plurality of simulated attacks, receiving a first attack signature, the first attack signature being configured to characterize a first one of the plurality of attacks, comparing the first attack signature to each of the training signatures to determine which of the training signatures most closely matches the first attack signature, displaying attack status information in a network status display in response to the first attack signature and a most closely matching training signature and adapting the security system to respond to a second one of the plurality of attacks, the second attack being characterized by a second attack signature that resembles the first attack signature. The adapting step, in one embodiment, comprises the steps of introducing the first attack signature to the security system as a new training signature, and mapping the new training signature into the network status display.

The present invention, in another embodiment, provides a dynamic network security system for responding to a security attack on a computer network. The computer network has a multiplicity of computer nodes. The system comprises a plurality of security agents configured to concurrently detect occurrences of security events on associated ones of the computer nodes, the security events characterizing the attack, a processor in data communication with the security agents and configured to process the security events to form an attack signature, and a network status display in communication with the processor and configured to display attack status information in response to the attack signature, the attack status information being representative of the attack. In one embodiment, the processor is trained to respond to a plurality of training signatures, each of the training signatures representing one of a plurality of simulated attacks, and the processor is further configured to compare the attack signature to each of the training signatures to determine which of the simulated attacks most closely matches the attack. The network status display presents a display map divided into a plurality of display cells and each of the training signatures is mapped into the display cells prior to the attack. The display cells are divided into a plurality of regions, the regions being configured to indicate an attack type and severity of the attack.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 3 shows an exemplary database of simulated attack information for a plurality of simulated attacks in accordance with a preferred embodiment of the present invention;

DETAILED DESCRIPTION OF THE DRAWINGS

Figure 1:
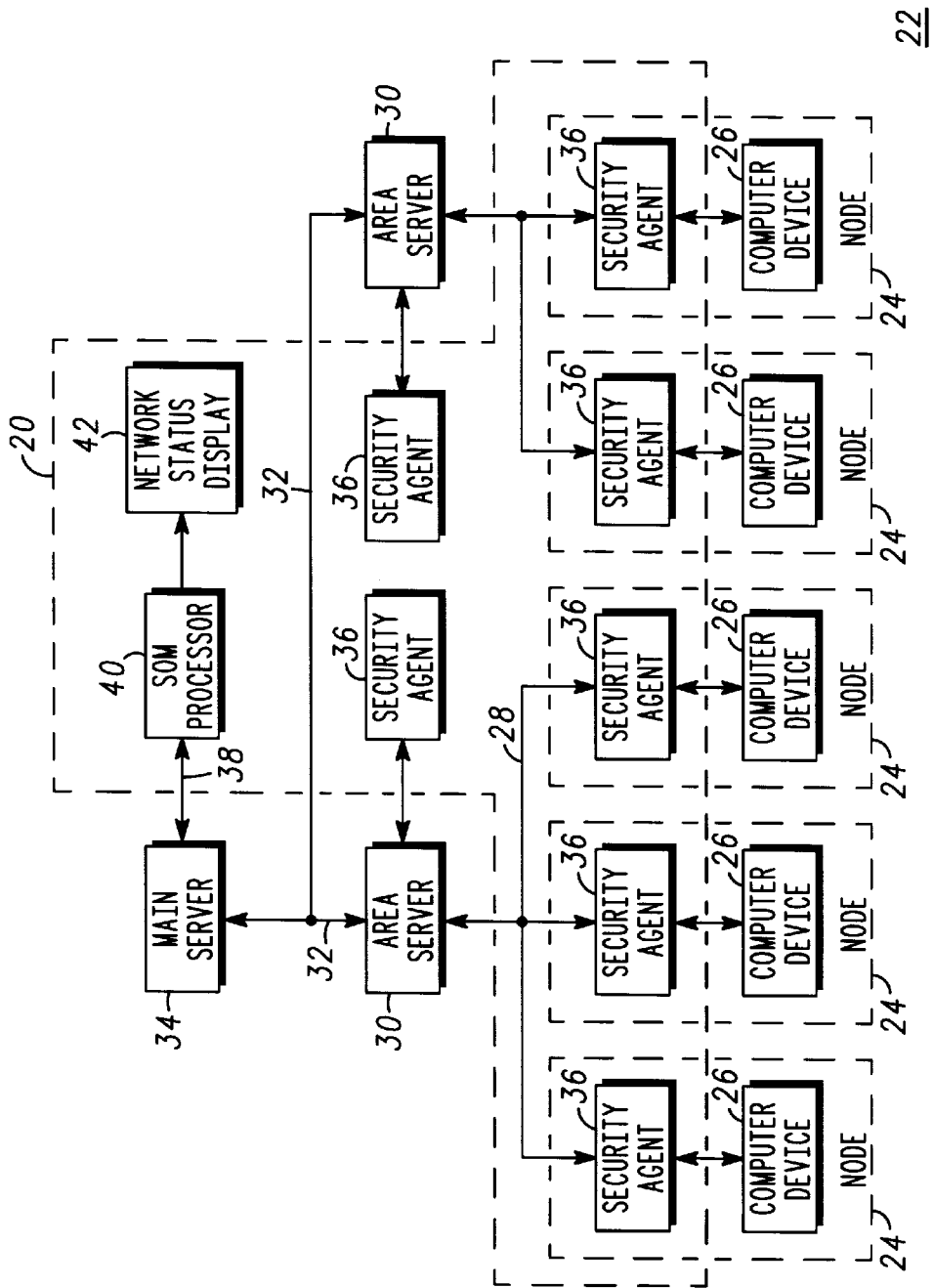
FIG. 1 shows a block diagram of a dynamic network security system in a computer network in accordance with a preferred embodiment of the present invention.

FIG. 1 shows a block diagram of a dynamic network security system 20 in a computer network 22 in accordance with a preferred embodiment of the present invention. Security system 20 is represented by a dashed line to illustrate that system 20 may be incorporated into an already existing network.

Computer network 22 includes a plurality of nodes 24. A computer device 26 is located at each of nodes 24. Computer device 26 may be a personal computer workstation or any other peripheral microprocessor based system. Nodes 24 are connected via conventional digital links 28 through area servers 30. In turn, area servers 30 are linked via conventional high speed digital links 32 to a main server 34.

For clarity of illustration, network 22 is shown with a small number of nodes 24, area servers 30, and digital links 28. However, those skilled in the art will recognize that many computer networks have a multiplicity of nodes that are arranged in a far more complicated hierarchical order. Furthermore, computer network 22 need not be located in one geographical location, for example in a single building or town. Rather computer network 22 may include nodes 24 that are located remotely from one another, for example in two or more different states or countries. In such a case, remotely located nodes 24 may still be related closely to one another in the hierarchical order of network 22.

Dynamic network security system 20 includes a plurality of security agents 36 each of which is associated with one or more nodes 24. Security agents 36 are configured to concurrently detect occurrences of security events (discussed below) on associated computer nodes 24. Security agents 36 are software programs located at nodes 24 and area servers 30 that identify security events as they appear at the nodal level. Security events may include port scans, malicious software, penetration attempts, and others that are identified through either a specific code signature or through actions or attempts at actions.

Security system 20 functions in conjunction with existing technologies for intrusion detection and other network attack recognition techniques. Most security events are defeated at the node level by the existing technologies such as by protection software and systems like firewalls and filters. However, of a greater concern are those security events that through cleverness or brute force pass beyond the first lines of defense into the interior of the network. Security system 20 is configured to recognize and mitigate the effects of the security events that pass beyond the first lines of defense provided by the existing technologies.

Data about security events is collected by security agents 36 and transmitted via links 28, links 32, and a communication link 38 to a processor 40. In a preferred embodiment, processor 40 is a self-organizing map (SOM) processor which applies a category of artificial neural network (ANN) technology. In another preferred embodiment, processor 40 is a linear vector quantization (LVQ) processor which applies a category of artificial neural network (ANN) technology.

ANNs attempt to process data in a manner reminiscent of the brain, in that they are given examples of desired behavior rather than algorithms. Thus, the most successful applications of ANNs have been in areas where the specific steps to reach a desired result are not known. By sufficient training, the ANN begins to identify the important pieces of data and the correlations that allow it to reach the correct conclusion. Thus, SOM processor 40 has the ability to be trained to respond to various types of input data, the training can be ongoing, and network 22 can change responses to the attack as the type of attack changes. SOM processors are known to those skilled in the art.

SOM processor 40 is configured to process security events to form an attack signature (discussed below). A network status display 42 is in communication with SOM processor 40. Network status display 42 is configured to display attack status information representative of an attack in response to the attack signature. Furthermore, network status display 42 in cooperation with SOM processor 40 is configured to display multi-dimensional data in a two dimensional image (discussed below).

SOM processor 40 and status display 42 may be incorporated into the processing and display capabilities of main server 34. Alternatively, SOM processor 40 and network status display 42 may form a separate microprocessor-based workstation for use by a network manager.

Figure 2:
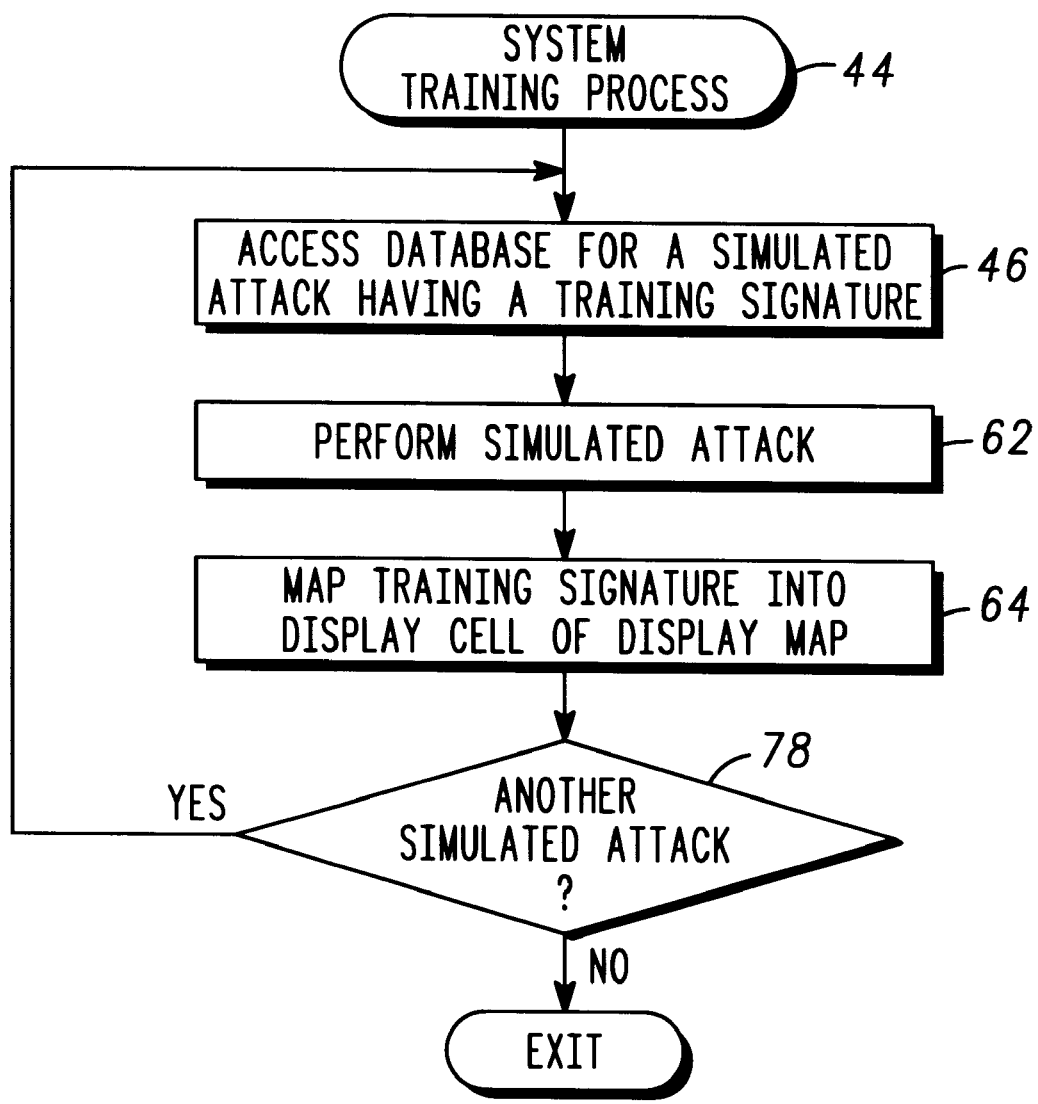
FIG. 2 shows a flowchart of a system training subprocess in accordance with a preferred embodiment of the present invention.

FIG. 2 shows a flowchart of a system training process 44 in accordance with a preferred embodiment of the present invention. As is conventional for systems that apply ANNs, dynamic network security system 20 (FIG. 1) is trained before system 20 is used to respond to attacks.

Process 44 begins with a task 46 which accesses a database of simulated attacks. For clarity of illustration, FIG. 3 shows an exemplary database 48 of simulated attack information for a plurality of simulated attacks 52 in accordance with a preferred embodiment of the present invention. For purposes of this description, an attack is defined as a plurality of security events 50 occurring substantially concurrently in a given sampling period at a plurality of nodes 24 (FIG. 1). The sampling period is an arbitrary amount of time that is of a sufficient length to receive enough security events to form an attack signature (discussed below) for an attack.

Each of simulated attacks 52 is a prediction of an attack type (discussed below) that may occur on network 22. Simulated attacks 52 are generated by an operator and stored in database 48. These predictions may be developed using network modeling tools or static analyzers and are based on historical data, attack trends, perceived threats, network hierarchy, and so forth.

Training signatures 53 for simulated attacks 52 are defined by a plurality of security events 50 of at least one security event type 56 in this example. Security events 50 are presented in database 48 in a column 58 as a percentage of security events per event type. In other words, column 58 represents the numbers of nodes 24 (FIG. 1) affected by each of security event types 56. A simulated attack includes at least one of security event types 56, but more realistically a simulated attack constitutes several security event types 56 as illustrated in first simulated attack 55. Each of security event types 56 are capable of causing an anti-security effect on computer network 22. In other words, the attacker is performing an unauthorized action on network 22. In this example, security event types 56 include destructive virus, snooping virus, worm, Trojan horse, FTP requests, and network overload. However, those skilled in the art will recognize that security event types may include these and/or additional evolving types of security events relative to the computer network for which dynamic network security system 20 (FIG. 1) is used.

In addition to security event types 56 and percentage of security events 50 per event type in column 58, training signatures 53 include location identifiers 60. Location identifiers 60 identify the nodes 24 in network 22 where security events may take place. Location identifiers 60 are important for ascertaining an attack severity 61 for each of simulated attacks 52. Attack severity 61 is a level of security breach that one of simulated attacks 52 could cause computer network 22. The greater attack severity 61, the more damaging the security breach would be.

Due to the complexity of the hierarchical order of a computer network having thousands of nodes, certain related nodes that are affected by simulated attacks 52 may result in greater overall negative impact or security breach to computer network 22 (FIG. 1) thus increasing the severity of simulated attacks 52. In database 48, attack severity 61 for each of simulated attacks 52 is shown as low, medium, or high. However, those skilled in the art will recognize that attack severity 61 may be categorized in many different forms. Generally, attacks which impact a greater number of nodes and nodes located higher in the network hierarchy, such as servers, will be considered to be more severe than attacks that impact only isolated workstations, but that is not a requirement.

With reference back to FIG. 2, following accessing task 46, a task 62 performs first simulated attack 55 (FIG. 3) having a first training signature 54 on computer network 22 (FIG. 1). Those skilled in the art will recognize that first simulated attack 55 is not launched against nodes 24 (FIG. 1) of computer network 22, but rather first simulated attack 55 is input into dynamic network security system 20 (FIG. 1) so that SOM processor 40 (FIG. 1) can receive and process the attack information.

Figures 4, 6:
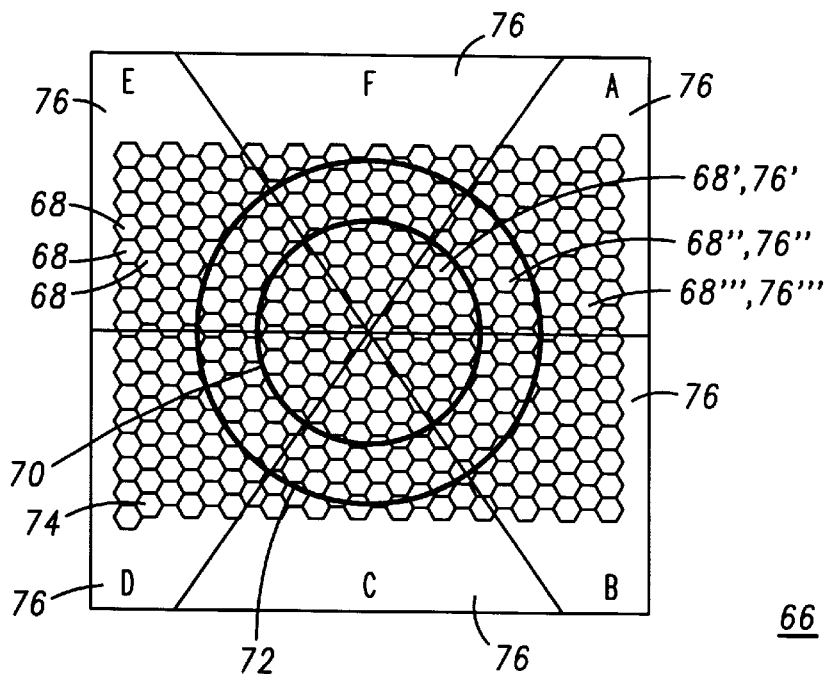
FIG. 4 shows a display map which forms a portion of a network status display in accordance with a preferred embodiment of the present invention.
FIG. 6 shows a table 90 of informational elements of a first attack having a first attack signature in accordance with a preferred embodiment of the present invention.

In response to performing first simulated attack 55 in task 62, a task 64 causes SOM processor 40 to map first training signature 54 into network status display 42 (FIG. 1). FIG. 4 shows a display map 66 which forms a portion of network status display 42 in accordance with a preferred embodiment of the present invention. Display map 66 is divided into a plurality of display cells 68, and each of display cells 68 is mathematically represented by a code vector.

A conventional self-organizating map algorithm, such as a learning vector quantization algorithm, employed by SOM processor 40 (FIG. 1) is a variant of a known self-organizing map algorithm of a type of artificial neural network technology. The self-organizing map algorithm plots a vector representative of first training signature 55 onto the two dimensional array of display cells 68 in such a way that vectors projected onto adjacent display cells 68 are more similar than vectors projected onto distant display cells 68. In other words, simulated attacks that most closely resemble one another are mapped into display cells 68 that are physically close to one another in display map 66.

Display map 66 includes a center region 70, a middle region 72, and an outer region 74. In the preferred embodiment, display cells 68 within center region 70 represent a computer network under an attack of low severity, display cells in middle region 72 represent a computer network under an attack of medium severity, and display cells in outer region 74 represent a computer network under an attack of high severity.

Regions 70, 72, and 74 of display map 66 are further subdivided into subregions 76. Subregions 76 are configured to indicate an attack type. In the exemplary embodiment, display map is divided into subregions 76, labeled A–F. By way of example, first simulated attack 55 exhibits a high occurrence of security event type 56 that is a "snooping virus" (FIG. 3). Snooping virus may be labeled as having an attack type of "A". So, SOM processor 40 (FIG. 1) maps a vector representative of first training signature 54 into display cell 68' which is located in middle region 72. Thus, the division of display map 66 into regions 70, 72, and 74 and subregions 76 indicates attack type and attack severity. When actual attack information from network 22 is then compared to display map 66, a network manager is provided with attack type and severity in a quickly interpretable form.

While, display map 66 provides a useful, quickly interpretable representation of attacks on computer network 22 (FIG. 1), those skilled in the art will recognize that there are any number of ways to visually represent attack information. However, the key behind the usefulness of display map 66 is the appropriate mapping of multi-dimensional vectors for training signatures 53 (FIG. 3) that are representative of simulated attacks 52 into the two dimensional image of display cells 68.

With reference back to task 64 (FIG. 2), following mapping of first training signature 54 into display map 66, process 44 proceeds with a query task 78. Query task 78 determines if there is another simulated attack to be input into dynamic network security system 20 (FIG. 1). Although only first training signature 54 has been discussed in detail, in order for display map 66 to be accurately mapped, many more simulated attacks 52 are processed by SOM processor 40 (FIG. 1).

The mapping of display map 66 (FIG. 4) is performed iteratively in a sequence of steps. Each step requires the presentation of one of training signatures 53, in the form of an input vector, to the array of display cells 68 (each of display cells 68 being represented by a code vector). The input vector for one of training signatures 53 is used as an argument to an activation function that estimates the similarity between the input vector and each of the code vectors for display cells 68. The most similar code vector representing one of display cells 68 as well as its neighborhood of display cells 68 is adjusted to improve response to subsequent simulated attacks having similar training signatures.

When another one of training signatures 53 is available, program control loops back to task 46 to access database 48, perform another one of simulated attacks 52, and map a vector representative of the training signature into display map 66. When another one of training signatures 53 is not available, then training process 44 is exited with initial training complete.

As illustrated in FIG. 3, training signatures for simulated attacks 52 are multi-dimensional vectors. Those skilled in the art will recognize that it is not necessary to map all possible combinations of event types to produce all possible types of simulated attacks. Rather, it is desirable to map only enough training signatures 53 to accurately portray a statistically significant number of attack types 76 (FIG. 4) into display map 66 (FIG. 4).

Figure 5:
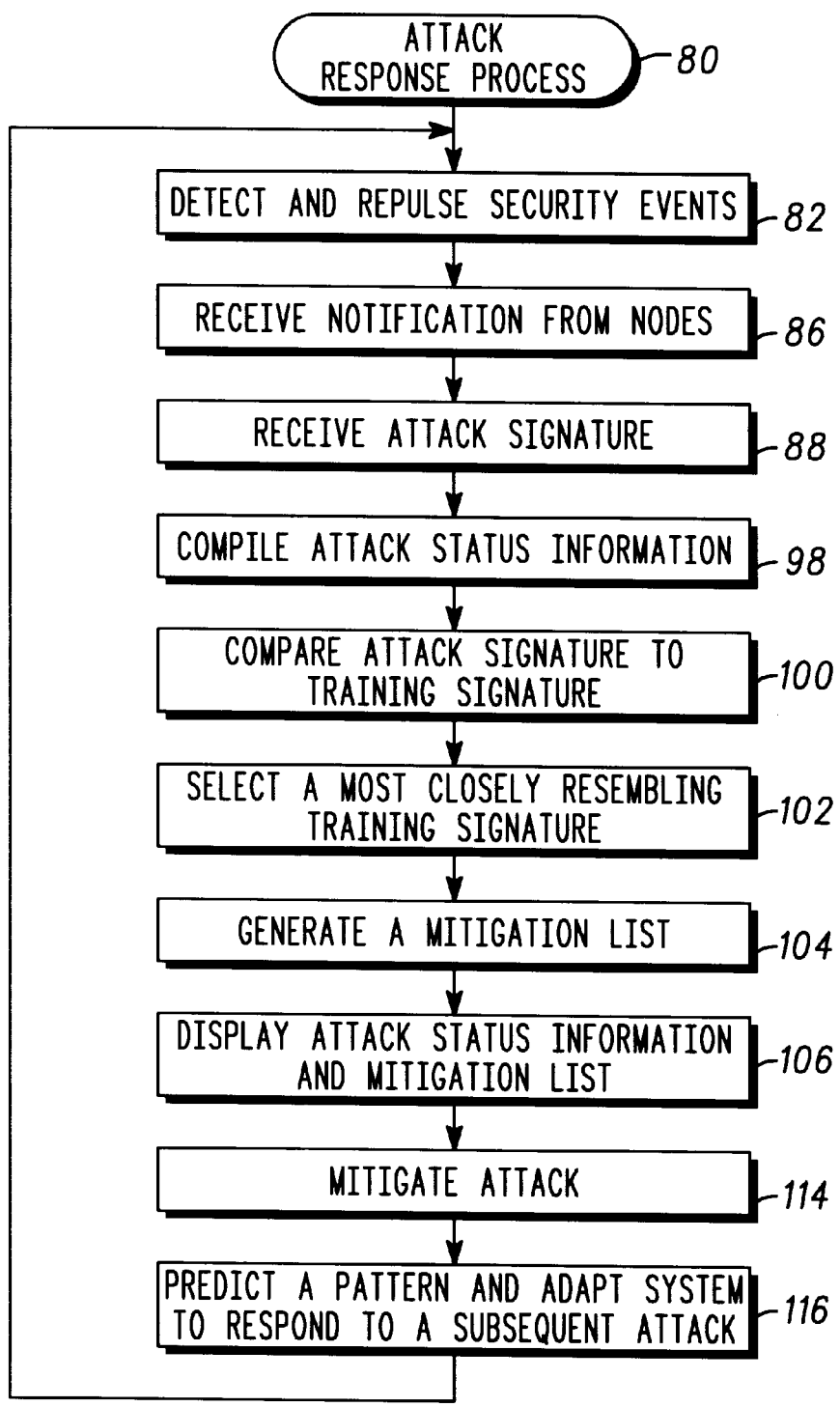
FIG. 5 shows a flowchart of an attack response process performed by the dynamic network security system in accordance with a preferred embodiment of the present invention.

Following system training process 44, dynamic network security system 20 is configured to respond to a plurality of attacks on computer network 22 (FIG. 1). FIG. 5 shows a flowchart of an attack response process 80 performed by dynamic network security system 20 (FIG. 1) in accordance with a preferred embodiment of the present invention. Process 80 is initiated by a network administrator, and once initiated, process 80 is ongoing to continually respond to security attacks on network 22.

Attack response process 80 begins with a task 82. Task 82 detects and repulses or at least attempts to repulse security events 50 (FIG. 3) at nodes 24. Task 82 is performed concurrently and autonomously at each of nodes 24 (FIG. 1) by conventional software tools installed on computer devices 26 (FIG. 1) such as virus detectors, firewalls, and the like.

In response to task 82, a task 86 is performed through each of security agents 36. Task 86 causes SOM processor 40 to be notified of an outcome of the repulsing task through one of security agents 36 associated with that node 24. The notification may include data describing a security event type, a location identifier for the node 24, and whether or not the attack was successfully repulsed. Following notification task 86, program control proceeds to a task 88.

Task 88 causes SOM processor 40 to receive an attack signature (discussed below) for an attack (discussed below). Information from security agents 36 about security events are combined at area servers 30 (FIG. 1) in network 22 (FIG. 1) by security agents 36 associated with area servers 30 that may take further action as needed and as possible. The attack information is then combined and transmitted up computer network 22 to form an attack signature (discussed below). The attack signature is received by SOM processor 40 (FIG. 1) for processing.

By way of example, FIG. 6 shows a table 90 of informational elements of a first attack 92 having a first attack signature 94 in accordance with a preferred embodiment of the present invention. First attack 92 constitutes a number of security events 50, shown in column 96 as percentage values, occurring at nodes 24 and categorized by security event types 56.

In conjunction with receiving task 88 (FIG. 5), a task 98 compiles attack status information regarding first a attack 92. Attack status information may include location identifiers 60, whether or not any of security events 50 were repulsed at nodes 24, nodal interrelationships, breadth of the attack, expected impact of the attack, and so forth.

Following task 98, a task 100 is performed by SOM processor 40 (FIG. 1). SOM processor 40 compares a vector representative of first attack signature 94 (FIG. 6) to each of training signatures 53 as mapped in display map 66 (FIG. 4).

In response to comparing task 100, a task 102 selects one of training signatures 53 that most closely matches attack signature. With reference back to FIG. 3, the security event types 56 and frequency of security events 50 shown in column 58 of training signature 54 most closely resembles first attack 92. Those skilled in the art will recognize that other factors will contribute to the selection of a most closely resembling training signature. Other factors may include but are not limited to, the location identifiers for each of the affected nodes, network hierarchy, and so forth.

In conjunction with task 102, a task 104 generates a mitigation list. A mitigation list is a list of recommended actions that may be taken to mitigate an attack. Some actions may include a disconnect of some nodes 24 of network 22, establishment of false targets, providing false, but realistic data, and so forth. The mitigation list may be generated during training process 44 (FIG. 2) or at any other time by a network administrator after evaluating various training attack scenarios.

Following tasks 102 and 104, a task 106 displays attack status information and the mitigation list on network status display 42 (FIG. 1).

Figure 7:
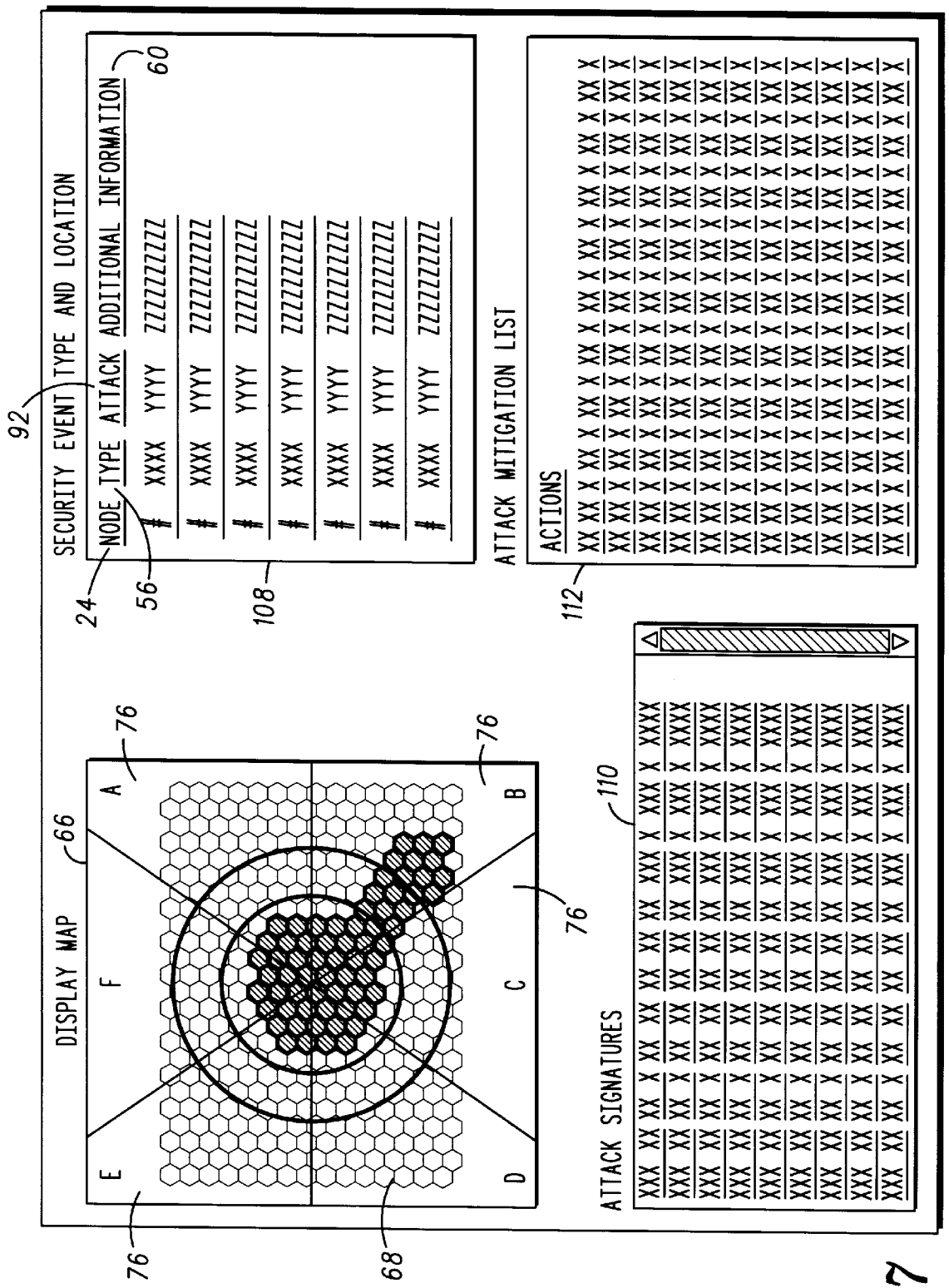
FIG. 7 shows the network status display in accordance with a preferred embodiment of the present invention.

FIG. 7 shows network status display 42 in accordance with a preferred embodiment of the present invention. Network status display 42 presents display map 66 and an attack status information list 108 showing security event type 56 and location identifiers 60 for first attack 92. Display 42 also presents an attack signature log 110 which provides current and historical perspective on a given attack record at various sample times. The attack signatures in log 110 are the text equivalent of the two dimensional image as highlighted in display map 66. In addition, display 42 includes attack mitigation list 112 which is a catalogue of actions that a network manager may take in order to mitigate first attack 92.

As shown in display map 66, multiple display cells 68 are darkened. In the preferred embodiment, one of display cells 68 is darkened for first attack 92 at a first sample time. A second one of display cells 68 is darkened to illustrate first attack 92 at a second sample time, and so forth. The image that emerges on display map 66 is network view of attack 92 and it's progression from a low severity attack shown in the darkened display cells 68 of center region 70 to a high severity attack shown in the darkened display cells 68 of outer region 74. Hence, display map 66 provides a means of tracking the attack severity and attack type over a period of time.

In an alternative embodiment, network status display 42 may display only display map 66. Each of the darkened display cells may then provide links, in the form of hypertext links, to attack status information list 108, attack signature log 110, attack mitigation list 112, and any other information as needed.

Referring back to FIG. 5, in response to task 106, a task 114 mitigates first attack 92. In some cases first attack 92 may be mitigated automatically by dynamic network security system 20. For example, SOM processor 40 may issue instructions to nodes 24 and 30 to not respond to external communications or to force new passwords. In other cases, mitigation may be activated by a network manager in response to attack mitigation list 112.

Following task 114, a task 116 predicts a pattern for subsequent attacks and adapts security system 20 to respond to subsequent attacks. Security system 20 is adapted by introducing first attack signature 94 into security system 20 as a new training signature and repeating training process 44 (FIG. 2). The result of introducing first attack signature 94 as a new training signature, and mapping a vector representative of the new training signature into display map 66, is an improved response to subsequent attacks that have subsequent training signatures that most closely resemble first attack signature 94. Thus, security system 20 is able to evolve with evolving threats.

In summary, a system and a method are provided that is capable of providing a network view of an attack as the attack is occurring. The system and method display attack information in a quickly interpretable two dimensional image that is provided to a network manager. The system and method provide the network manager with knowledge of the attack severity and overall nature of the attack, as well as its expected impact, and a mitigation list of recommended actions for mitigating the attack. In addition, the system and method have the ability to evolve with evolving threats to mitigate new approaches to network attacks by employing a linear vector quantization algorithm of artificial neural network technology.

Although the preferred embodiments of the invention have been illustrated and described in detail, it will be readily apparent to those skilled in the art that various modifications may be made therein without departing from the spirit of the invention or from the scope of the appended claims. For example a conventional linear vector quantization algorithm may be employed rather than the self-organizing map algorithm. In addition, the display map of the network status display may be arranged differently. For example, the attack severity may increase as an attack is displayed moving from the outer region of the display map to the inner region of the display map.

What is claimed is:

1. A dynamic network security system for responding to a security attack on a computer network, said computer network having a multiplicity of computer nodes, and said system comprising:

a plurality of security agents, each security agent being associated with at least one of the computer nodes and located at the associated computer node, each security agent being configured to detect occurrences of security events on the associated ones of said computer nodes, said security events characterizing said attack, said security events comprising at least one the group consisting of performing of an unauthorized action on the associated computer node, performing port scans on the associated node, operating malicious software on the associated computer node, and initiating unauthorized penetration attempts on the associated computer node, wherein each security agent is configured to transfer data about the security events on the associated computer nodes;

a self-organizing map (SOM) processor in data communication with each of said security agents and configured to process said data about said security events to form an attack signature; and a network status display in communication with said processor and configured to display attack status information in response to said attack signature, said attack status information graphically representing a severity of said attack, wherein the SOM processor is configured to compare the attack signature with a plurality of training signatures and respond to the security attack.

2. A system as claimed in claim 1 wherein said SOM processor is a linear vector quantization (LVQ) processor.

3. A system as claimed in claim 1 wherein:

said SOM processor is trained to respond to the plurality of training signatures, each of said training signatures representing one of a plurality of simulated attacks; and said processor is further configured to compare said attack signature to each of said training signatures to determine which of said simulated attacks most closely matches said attack.

4. A system as claimed in claim 1 wherein said network status display provides a two dimensional image of said computer network, and said network status display is configured to link said attack status information to said two dimensional image.

5. A system as claimed in claim 4 wherein said attack status information includes a location identifier and a security event type for each of said security events characterizing said attack.

6. A system as claimed in claim 1 wherein said network status display further comprises an attack mitigation list, said attack mitigation list being a catalogue of actions to take to mitigate said attack.

7. A dynamic network security system for responding to a security attack on a computer network, said computer network having a multiplicity of computer nodes, and said system comprising:

a plurality of security agents configured to concurrently detect occurrences of security events on associated ones of said computer nodes, said security events characterizing said attack;

a processor in data communication with said security agents and configured to process said security events to form an attack signature; and a network status display in communication with said processor and configured to display attack status information in response to said attack signature, said attack status information being representative of said attack, wherein said processor is trained to respond to a plurality of training signatures, each of said training signatures representing one of a plurality of simulated attacks; and said processor is further configured to compare said attack signature to each of said training signatures to determine which of said simulated attacks most closely matches said attack, and wherein:

said network status display presents a display map divided into a plurality of display cells; and each of said training signatures is mapped into said display cells prior to said attack, and wherein said display cells are divided into a plurality of regions, said regions being configured to indicate an attack type and severity of said attack.

8. A method of operating a dynamic network security system to respond to a plurality of attacks on a computer network, said method comprising the steps of:

training said security system to respond to a plurality of training signatures, each of said training signatures representing one of a plurality of simulated attacks;

receiving a first attack signature, said first attack signature being configured to characterize a first one of said plurality of attacks;

comparing said first attack signature to each of said training signatures to determine which of said training signatures most closely matches said first attack signature;

displaying attack status information in a network status display in response to said first attack signature and a most closely matching training signature; and adapting said security system to respond to a second one of said plurality of attacks, said second attack being characterized by a second attack signature that resembles said first attack signature, wherein said network status display provides a two dimensional image of said computer network, said network status display being divided into a plurality of display cells, and said training step comprises the steps of:

performing a first one of said simulated attacks on said network, said first simulated attack having a first training signature;

mapping said first training signature into one of said display cells in response to said first simulated attack; and repeating said performing and mapping steps for the remaining ones of said training signatures.

9. A method as claimed in claim 8 wherein:

each of said training signatures represents at least one security event type and an attack severity for each of said simulated attacks, said at least one security event type being at least one of a plurality of known security event types, each of said known security event types causing an anti-security effect on said computer network, and said attack severity being a level of security breach said simulated attack causes said computer network; and said mapping step positions said first training signature into said one of said display cells in response to said at least one security event type and said attack severity.

10. A method of operating a dynamic network security system to respond to a plurality of attacks on a computer network, said method comprising the steps of:

training said security system to respond to a plurality of training signatures, each of said training signatures representing one of a plurality of simulated attacks;

receiving a first attack signature, said first attack signature being configured to characterize a first one of said plurality of attacks;

comparing said first attack signature to each of said training signatures to determine which of said training signatures most closely matches said first attack signature;

displaying attack status information in a network status display in response to said first attack signature and a most closely matching training signature; and adapting said security system to respond to a second one of said plurality of attacks, said second attack being characterized by a second attack signature that resembles said first attack signature, wherein said displaying step further comprises the step of tracking a change in said at least one security event type and said attack severity of said first attack.

11. A method as claimed in claim 10 wherein said computer network has a multiplicity of nodes and said method further comprises the steps of:

detecting security events on said nodes to form said first attack signature for said first attack;

repulsing said security events at said nodes in response to said detecting step; and notifying said security system of an outcome of said repulsing step.

12. A method as claimed in claim 11 further comprising the step of:

compiling said attack status information in response to said receiving step, said attack status information being configured to include location identifiers and security event type identifiers for each of said security events in said first attack.

13. A method as claimed in claim 10 further comprising the steps of:

generating a mitigation list in response to said comparing step, said mitigation list being a catalogue of actions to take to mitigate said first attack; and displaying said mitigation list.

14. A method as claimed in claim 10 further comprising the step of mitigating said first attack in response to said comparing step.

15. A method as claimed in claim 10 wherein:

said first attack signature identifies at least one security event type and severity of said attack; and said displaying step displays said attack status information in response to said at least one security event type and said attack severity.

16. A method as claimed in claim 10 wherein said adapting step further comprises the step of predicting a pattern of subsequent attacks, said subsequent attacks being characterized by subsequent signatures that resemble said first attack signature.

17. A method of operating a dynamic network security system to respond to a plurality of attacks on a computer network, said method comprising the steps of:

training said security system to respond to a plurality of training signatures, each of said training signatures representing one of a plurality of simulated attacks;

receiving a first attack signature, said first attack signature being configured to characterize a first one of said plurality of attacks;

comparing said first attack signature to each of said training signatures to determine which of said training signatures most closely matches said first attack signature;

displaying attack status information in a network status display in response to said first attack signature and a most closely matching training signature; and adapting said security system to respond to a second one of said plurality of attacks, said second attack being characterized by a second attack signature that resembles said first attack signature, wherein said adapting step comprises the steps of:

introducing said first attack signature to said security system as a new training signature; and mapping said new training signature into said network status display.

18. A method of operating a dynamic network security system to respond to a first and a second attack on a computer network, said computer network having a multiplicity of nodes, said method comprising the steps of:

training said security system to respond to a plurality of training signatures, each of said training signatures representing one of a plurality of simulated attacks;

detecting security events on said nodes to form a first attack signature representing said first attack, each of said security events causing an anti-security effect on said computer network;

comparing said first attack signature to each of said training signatures to determine which of said training signatures most closely resembles said first attack signature;

generating a mitigation list, said mitigation list being a catalogue of actions to take to mitigate said first attack;

displaying attack status information and said mitigation list in a network status display in response to said first attack signature and a most closely matching training signature, said attack status information being configured to include location identifiers and a security event type for each of said security events;

mitigating said attack; and adapting said security system to respond to said second attack, said second attack being characterized by a second attack signature that most closely resembles said first attack signature, wherein said network status display provides a two dimensional image of said computer network, said network status display being divided into a plurality of display cells, and said training step comprises the steps of:

performing a first one of said simulated attacks on said network, said first simulated attack having a first training signature;

mapping said first training signature into one of said display cells in response to at least one security event type and an attack severity for said first training signature, said at least one security event type being at least one of a plurality of known security event types, each of said known security event types being configured to cause an anti-security effect on said computer network, and said attack severity being a level of security breach said simulated attack causes said computer network; and repeating said performing and mapping steps for remaining ones of said training signatures.

19. A method as claimed in claim 18 further comprising the steps of:

repulsing said security events at said nodes in response to said detecting step; and notifying an operator of an outcome of said repulsing step.

* * * * *